2,975,202

CYCLOSILOXANE POLYMERS

Robert Y. Mixer, Kenmore, N.Y., assignor to Union Carbide Corporation, a corporation of New York No Drawing. Filed Oct. 31, 1955, Ser. No. 544,028

6 Claims. (Cl. 260—448.2)

This invention relates to polymerization reactions and has for an object the provision of novel chemical compounds in the form of cyclosiloxane polymers; novel compositions of matter consisting essentially of mixtures of cyclosiloxane polymers; and novel linear polymers comprised of siloxane units or groups of the cyclosiloxane polymers of the invention. More particularly, the invention contemplates the provision of (1) novel chemical compounds comprising cyclosiloxane polymers having at least one ethyl vinyl siloxane unit and at least two dimethyl siloxane units; (2) novel compositions of matter consisting essentially of mixtures of such cyclosiloxane polymers; (3) chemical products in the forms of oils, fluids, gums and similar substances useful as intermediates in polymerization reactions and processes, and including (a) linear siloxane polymers comprised of ethyl vinyl and dimethyl siloxane groupings of the cyclosiloxane polymers of the invention, (b) copolymers or mixed polymers comprised of organic molecular units or monomers and ethyl vinyl and dimethyl siloxane groupings of the cyclosiloxane polymers of the invention, and (c) homopolymers obtained by addition polymerization of the cyclosiloxane polymers of the invention; and (4) plastic substances in which linear polymers are crosslinked through vinyl groups of the ethyl vinyl siloxane groupings of the cyclosiloxane polymers of the invention. A further object of the invention is the provision of specific methods and procedures for producing the novel compounds and compositions of the invention.

It is now well established in industry that many useful organosilicon compounds may be prepared by bonding various saturated organic groups or atoms to silicon atoms, and, that compounds thus prepared can be hydrolyzed to form a corresponding organosilanol which, in turn, may be dehydrated to form polymeric silicon oxides or siloxanes. Vinyl-substituted siloxanes are of significant interest because the reactivity of a silicon-bonded vinyl group permits the application of specialized curing techniques, other than conventional siloxane condensation procedures, to polymers containing unsaturated groups of this type, such, for example, as in the production of silicone rubbers. Silicon-bonded vinyl groups can be incorporated into high molecular weight siloxanes by conventional chlorosilane cohydrolysis procedures, but for many applications these techniques are not entirely satisfactory. Thus, the incorporation and uniform distribution of very small amounts of silicon-bonded vinyl groups within a polymer would be difficult to control in cohydrolysis. Further, in lieu of crude cohydrolyzates, a particular process or reaction may require individual low molecular weight siloxanes as starting materials either for reasons of economy or because of the desired mechanism of reaction sought, and the compounds and compositions of the present invention are ideally suited for this purpose. Specifically, the compounds and compositions of the invention are useful intermediates in the preparation of vinyl-containing silicones and silicone rubbers, and in the preparation of copolymers with organic monomers. The compounds and compositions find particular application as vinyl modifiers in the preparation of silicone elastomers.

The group of cyclosiloxane polymers constituting the compounds and compositions of the invention may be defined as follows:

(1) Bis(ethylvinylsiloxane), bis(dimethylsiloxane) cyclic tetramer,

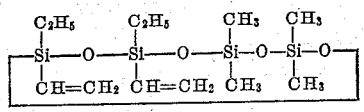

and the isomeric forms thereof, which may be represented, also, by the formulae, $$[(C_2H_5)(CH_2=CH)SiO]_2 \cdot [(CH_3)_2SiO]_2$$

or $$[(EtViSiO)_2 \cdot (Me_2SiO)_2]$$

wherein Et and Me represent the ethyl and methyl groups, respectively, and Vi represents the vinyl groups; and (2) Ethylvinylsiloxane, tris(dimethylsiloxane) cyclic tetramer,

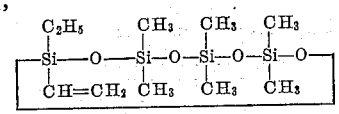

and the isomeric forms thereof, which may be represented, also, by the formulae, $$[(C_2H_5)(CH_2=CH)SiO] \cdot [(CH_3)_2SiO]_3$$

or $$[(EtViSiO) \cdot (Me_2SiO)_3]$$

wherein Et, Me and Vi have the meaning assigned above.

While the compounds of the invention are, themselves, essentially cyclosiloxane polymers when considered independently as chemical compounds, they function as monomers when employed in the production of linear polymers, each forming a monomeric constituent of the polymer chains comprising oils or fluids, gums and other intermediates suitable for use in carrying out further polymerization reactions. They provide for effective crosslinking between and among linear polymers and copolymers through the agencies of the unsaturated hydrocarbon groups contained therein.

Preparation of the novel hydrocarbon-substituted cyclosiloxane polymers of the invention may be effected by conventional procedures involving cohydrolysis of mixed hydrocarbon-substituted dichlorosilanes in which the substituent groups consist of saturated and unsaturated groups, i.e., dimethyl-substituted dichlorosilane and ethylvinyl-substituted dichlorosilane, to produce a crude cohydrolyzate containing hydrocarbon-substituted cyclosiloxanes whose hydrocarbon substituents consist of mixed ethyl and vinyl groups, and methyl groups, followed by depolymerization of the crude cohydrolyzate to produce a depolymerizate containing mixed cyclosiloxane polymers of the invention, which may be separated and recovered in pure forms by fractional distillation of the mixed depolymerizate.

The invention may be best understood by reference to the following specific examples of typical preparations and recoveries of compounds and compositions of the invention:

EXAMPLE I

Preparation of mixed cohydrolizate:

(1) Bis(ethylvinylsiloxane), bis(dimethylsiloxane) cyclic tetramer
and
(2) Ethylvinylsiloxane, tris(dimethylsiloxane) cyclic tetramer A mixture consisting of 5620 grams of dimethyl dichlorosilane (containing less than 0.3% of methyl trichlorosilane), 2145 grams of ethylvinyl dichlorosilane, and 1520 grams of isopropyl ether, was formed in a twelve (12) liter round bottom kettle equipped with dropping funnel, thermometer, and condenser. Water in a volume of 1315 cc. (which included a 25 percent excess of water), was added to the mixture in the kettle, dropwise, with constant stirring at room temperature. Following the addition of water, the kettle was heated to 50° C., with agitation, and the product within the kettle was washed four times with separate 2 to 3 liter portions of water. Thereafter, a Dean Stark Separator was attached to the kettle, and the kettle heated to a temperature of about 65° C. with nitrogen sparge and agitation to dehydrate and strip out remaining isopropyl ether. At this point the product had a chloride content of 0.17 percent by weight. Sodium bicarbonate (NaHCO₃), in amount of 120 grams was added to the product in the kettle, and, thereafter, the kettle was heated to a temperature of about 75° C. with nitrogen sparge, for one (1) hour. The product was cooled to about 50° C. and filtered. A cohydrolyzate consisting essentially of $$(EtViSiO)_x(Me_2SiO)_y$$

was obtained in amount of 3985 grams. The chloride content of the product was nil. Iodine absorption indicated the presence of ninety-seven percent (97%) of theoretical vinyl groups originally present.

EXAMPLE II

Preparation of pure compounds:

(1) Bis(ethylvinylsiloxane), bis(dimethylsiloxane) cyclic tetramer and (2) Ethylvinylsiloxane, tris(dimethylsiloxane) cyclic tetramer A charge was formed by mixing 375 grams of the cohydroylzate of Example I, containing 15.6 mole percent ethylvinylsiloxane, with 100 grams of hexadecene-1 ($n_D^{25}$ 1.4386), and 10 grams of potassium silanolate catalyst (containing about three percent (3%) potassium by weight). The charge was heated at 150° C. at 30 mm. Hg, and, after heating had been continued for a period of about two (2) hours, the pressure was reduced to about 1 mm. Hg, to effect removal of all volatiles. The distillate consisted of 299 grams of material ($n_D^{25}$ 1.4230). To the viscous residue there was added, 50 grams of hexadecene-1 and 5 grams of the above catalyst. Thereafter, the mixture was heated at 150° C. at a pressure of 30 mm. Hg for about two (2) hours, after which the pressure was reduced to 20 mm. Hg for two (2) hours, and, finally, to 1 mm. Hg with heating being continued until no further material came over as a distillate. The distillate recovered contained 218 grams of material ($n_D^{25}$ 1.4230).

The total recovered depolymerizate, in amount of 517 grams, was charged to a 1" x 22" column packed with "Heli-Pak" packing and distilled at a pressure of 20 mm. Hg and at 20:1 and 40:1 reflux ratios.

The fractionation treatment yielded 100 grams of the ethylvinylsiloxane, tris(dimethylsiloxane) cyclic tetramer, [(EtViSiO)·(Me₂SiO)₃], and 85 grams of the bis(ethylvinylsiloxane), bis(dimethylsiloxane) cyclic tetramer, [(EtViSiO)₂·(Me₂SiO)₂], having the following physical properties, respectively:

|  | (EtViSiO)· (Me₂SiO)₃ | (EtViSiO)₂· (Me₂SiO)₂ |
| --- | --- | --- |
| Boiling Point (° C.) | 98/20 mm. Hg | 123/20 mm. Hg |
| Refractive Index ($n_D$ at 25° C.) | 1.4084 | 1.4184 |
| Density ($d_4^{25}$) (gr./cc.) | 0.9567 | 0.9639 |
| Molar Refraction: |  |  |
| (Found) | 83.25 | 91.22 |
| (Calc.) | 83.35 | 92.14 |
| Bromine Absorption (Found) (gr. Br/100 gr. product) | 46.0 | 71.5 |
| Bromine Absorption (Theor.) (gr. Br/100 gr. product) | 49.7 | 91.9 |

The infrared spectrum for ethylvinylsiloxane, tris(dimethylsiloxane) cyclic tetramer showed typical absorptions due to ViSi, Me₂Si, CH₂=CH— groupings, and similar bands were demonstrated upon analysis of the bis(ethylvinylsiloxane), bis(dimethylsiloxane) cyclic tetramer.

EXAMPLE III

*Preparation of gum copolymers from (ethylvinylsiloxane), tris(dimethylsiloxane) cyclic tetramer, and octamethylcyclotetrasiloxane, [(CH₃)₂SiO]₄*

PREPARATION

It was found that the cyclic tetramer, (ethylvinylsiloxane), tris(dimethylsiloxane), can be copolymerized with octamethylcyclotetrasiloxane to yield a gum stock which, when compounded into a rubber, has essentially the same physical properties as a "standard" ethylvinylsiloxane-containing gum stock made by copolymerizing ethylvinylsiloxane cyclic trimer (EtViSiO)₃, and octamethylcyclotetrasiloxane, and containing the same ethylvinylsiloxane content.

Thus, 1.92 grams of (ethylvinylsiloxane), tris(dimethylsiloxane) of Example II (equivalent to 0.12 percent by weight of ethylvinylsiloxane content), and 400 grams of octamethylcyclotetrasiloxane were charged into a one pint vessel and heated to 148° C., at which point potassium silanolate was added as a catalyst in an amount equivalent to 30 parts of potassium per million parts of the mixture. The catalyst was well dispersed and the vessel sealed and placed in an oven maintained at 150° C. for three hours. The resulting gum showed a Miniature Penetrometer Reading of 48.

COMPOUNDING

The gum stock was compounded into a silicone rubber by milling together 100 parts by weight of the gum stock and 40 parts by weight of "Santocel CS" (finely-divided silica) filler, and subjecting the milled product to a precure heat-aging treatment for two (2) hours at a temperature of 300° F., at which time 0.6 parts by weight of ditertiary-butyl peroxide catalyst was milled into the elastomer compound and it was mold-cured for twenty-five (25) minutes at 175° C.

The following tabulated data show a comparison of the physical properties of this rubber and a rubber formed from ethylvinylsiloxane cyclic trimer and octamethylcyclotetrasiloxane by the same procedure:

ELASTOMER PROPERTIES
MOLD CURE

|  | Tensile (p.s.i.) | Elongation (Percent) | Hardness (Shore A) | Set at Break (Percent) |
| --- | --- | --- | --- | --- |
| (EtViSiO)₃—0.12 percent by weight EtViSiO | 1,170 | 500 | 55 | nil |
| (EtViSiO)·(Me₂SiO)₃—0.12 percent by weight EtViSiO | 1,200 | 400 | 45 | nil |

POSTCURED (24 HOURS AT 480° F.)

|  |  |  |  |  |
| --- | --- | --- | --- | --- |
| (EtViSiO)₃—0.12 percent by weight EtViSiO | 910 | 400 | 62 |  |
| (EtViSiO)·(Me₂SiO)₃—0.12 percent by weight EtViSiO | 850 | 300 | 50 |  |

(EtViSiO)₃—
  Weight loss=4.8 percent
  Compression set=20.4 percent
(EtViSiO)(Me₂SiO)₃—
  Weight loss=5.9 percent
  Compression set=20.6 percent More detailed information with respect to the production of various intermediate polymeric compounds incorporating ethyl vinyl siloxane units of the type herein described, and silicone elastomers produced from such compounds, as well as methods and procedures for the production and compounding of such intermediates and elastomers, may be obtained by reference to copending United States application Serial No. 470,834, of Bailey et al., entitled "Silicone Elastomers," which was filed on November 23, 1954.

In general, I have found that the ethyl vinyl cyclic siloxanes of the invention are more compatible with most organic materials than are the methyl vinyl cyclic siloxanes. The ethyl vinyl cyclic siloxanes of the invention have a further advantage over the methyl vinyl cyclic siloxanes in that they are less volatile, and thus there is less danger of loss of the critically small percentages used when copolymerizing with other siloxanes at elevated temperatures.

Since it is considered obvious that many changes and modifications can be made in the foregoing methods and procedures without departing from the nature and spirit of my invention, it is to be understood that the invention is not to be limited to the specific details offered by way of illustration above, except as set forth in the following claims.

I claim:
1. A polymeric substance selected from the group consisting of the compounds bis(ethylvinylsiloxane), bis(dimethylsiloxane) cyclic tetramer and ethylvinylsiloxane tris(dimethylsiloxane) cyclic tetramer, and mixtures of such compounds.
2. A chemical compound in the form of a cyclosiloxane polymer consisting of one ethyl vinyl siloxane unit and three dimethyl siloxane units.
3. A chemical compound in the form of a cyclosiloxane polymer consisting of two ethyl vinyl siloxane units and two dimethyl siloxane units.
4. A composition of matter in the form of a mixture of cyclosiloxane polymers comprising (1) a cyclosiloxane polymer consisting of one ethyl vinyl siloxane unit and three dimethyl siloxane units, and (2) a cyclosiloxane polymer consisting of two ethyl vinyl siloxane units and two dimethyl siloxane units.
5. The chemical compound bis(ethylvinylsiloxane), bis(dimethylsiloxane) cyclic tetramer represented by the formula:

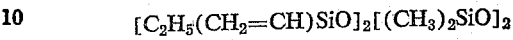

6. The chemical compound ethylvinylsiloxane, tris(dimethylsiloxane) cyclic tetramer represented by the formula:

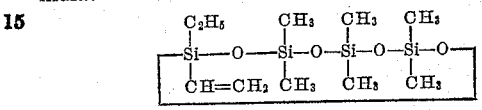

References Cited in the file of this patent

UNITED STATES PATENTS

| | | |
|---|---|---|
| 2,445,794 | Marsden | July 27, 1948 |
| 2,495,363 | Barry et al. | Jan. 24, 1950 |
| 2,645,628 | Hurd | July 14, 1953 |
| 2,756,246 | Burkhard | July 24, 1956 |

OTHER REFERENCES

McGregor: "Silicones and Their Uses," McGraw-Hill Book Company Inc., New York, publishers (1954), pages 268–272.